(12) United States Patent
Rothfuss et al.

(10) Patent No.: US 6,917,891 B2
(45) Date of Patent: Jul. 12, 2005

(54) SYSTEMS AND METHODS FOR DIAGNOSING AND PREDICTING FLUID FLOW SYSTEMS USING SENSORS

(75) Inventors: Kevin A. Rothfuss, Webster, NY (US); Richard J. Depoint, Penfield, NY (US); Sami S. Hanna, Fairport, NY (US); Ahmed-Mohsen T. Shehata, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 77 days.

(21) Appl. No.: 10/248,913

(22) Filed: Feb. 28, 2003

(65) Prior Publication Data

US 2004/0172210 A1 Sep. 2, 2004

(51) Int. Cl.[7] .............. G01F 1/12; G01F 1/00; G01F 7/00
(52) U.S. Cl. .......... 702/100; 702/47; 702/50; 73/861.04; 73/196
(58) Field of Search .......... 702/100, 45, 47, 702/50, 51; 73/861.04, 861.39, 195, 196, 198

(56) References Cited

U.S. PATENT DOCUMENTS

| | | | |
|---|---|---|---|
| 4,132,349 A | * | 1/1979 | Khoja et al. .......... 494/84 |
| 4,839,571 A | * | 6/1989 | Farnham et al. .......... 340/606 |
| 5,224,387 A | * | 7/1993 | Lindenbaum et al. .. 73/861.356 |
| 5,455,777 A | * | 10/1995 | Fujiyama et al. .......... 702/34 |
| 5,509,648 A | | 4/1996 | Chen et al. |
| 5,626,744 A | | 5/1997 | Neuwirth |
| 5,772,732 A | | 6/1998 | James et al. |
| 5,846,302 A | | 12/1998 | Putro |
| 5,858,224 A | | 1/1999 | Schwandt |
| 5,871,651 A | | 2/1999 | McSpadden |
| 5,970,436 A | | 10/1999 | Berg et al. |
| 6,127,907 A | | 10/2000 | Furuya et al. |
| 6,141,629 A | | 10/2000 | Yamamoto et al. |
| 6,164,032 A | | 12/2000 | Beck |
| 6,168,646 B1 | | 1/2001 | Craig et al. |
| 6,214,239 B1 | | 4/2001 | Renau |
| 6,704,617 B2 | * | 3/2004 | Cherfane et al. .......... 700/239 |
| 6,711,949 B1 | * | 3/2004 | Sorenson .......... 73/313 |

* cited by examiner

Primary Examiner—Bryan Bui
Assistant Examiner—Meagan S Walling
(74) Attorney, Agent, or Firm—Oliff & Berridge, PLC

(57) ABSTRACT

A fluid flow system for continuously monitoring the flow of fluid including fluid flow conduit with an upstream side and a downstream side, sensors and fluid flow elements, with the method for analyzing the operation of a fluid flow system by determining whether the fluid flow subsystem of the main system is operating properly, inputting a sensor reading of the parameter in the fluid flow of the main system and outputting an error indication of the main system.

23 Claims, 6 Drawing Sheets

SYSTEMS AND METHODS FOR DIAGNOSING AND PREDICTING FLUID FLOW SYSTEMS USING SENSORS

BACKGROUND OF THE INVENTION

1. Field of Invention

This invention is directed to systems and a methods for using sensors to determine problems that occur in fluid flow systems.

2. Description of Related Art

Conventionally, when determining problems in fluid flow systems, such as the remaining life of a filter through which the fluid flows, a discrete flow or pressure sensor is used to detect the end life for filters and time for filter replacement. These sensors are used to ensure that a minimum or maximum amount of fluid flow, such as fluid, is achieved for proper functioning. The proper flow or pressure may not be achieved because the filters may be clogged, or at least dirty enough to prevent proper functioning. At this point, service of the filters through which the fluid flows is required.

Normally, when the sensor value reaches a threshold value for a predetermined level of dirt accumulation in the filter, the machine in which that fluid flow is present will no longer function. Accordingly, a message is displayed for the user to contact service, to replace the filter or other components, or the like. Although sufficient to prevent the filters from accumulating additional dirt, which may cause damage to the machine, this approach results in unscheduled service and maintenance operations that often occur at very inopportune times.

SUMMARY OF THE INVENTION

One conventional way to avoid this result is to predetermine a sensor value, which is close to a failure value, but where the machine can continue to function. At that time, the user is notified that maintenance should be scheduled shortly, at a convenient time.

Setting a predetermined sensor value that indicates need for maintenance may alleviate unscheduled services and maintenance at inopportune time. However, this still requires a service call at a prearranged time and requires the service personnel to perform a battery of tests to determine the probable time for the next service call. This predetermined service most likely is too early for the service personnel to perform other work. This ineffective use of service personnel is but one problem not addressed by conventional systems and methods.

Accordingly, systems and methods for using the service personnel more effectively would be desirable.

This invention provide systems and methods that give warning of both the need to call a service personnel and the remaining time before the fluid flow system needs to be shutdown.

This invention separately provides systems and methods that continuously monitor sensors in fluid flow subsystems.

This invention separately provides systems and methods that continuously monitor pressure readings of fluid flow subsystems.

This invention separately provides systems and methods that continuously monitor volume flow readings of fluid flow subsystems.

This invention separately provides systems and methods that continuously use the sensor readings to diagnose fluid flow subsystems.

This invention separately provides systems and methods that continuously monitor several fluid flow subsystems.

This invention separately provides systems and methods that give warnings based on a diagnosis of a fluid flow subsystem.

This invention separately provides methods and systems that stop an apparatus based on a diagnosis of fluid flow subsystems.

In various exemplary embodiments of the systems and methods according to this invention, a warning before shutting down the fluid flow system may be given to call a service personnel by beeps and chimes, flashing displays, and/or indications on a monitor, or other data communications devices, systems or structures, while the time remaining can be given by the intensity of the chimes, flashing displays, or by numerical estimates.

In various exemplary embodiments of the systems and methods according to this invention, the fluid flow subsystem may be continuously monitored or monitored at defined or determined intervals. In various exemplary embodiments of the systems and methods according to this invention, the pressure readings of fluid flow subsystems may be continuously monitored or monitored at defined or determined intervals. In various exemplary embodiments of the systems and methods according to this invention, the volume flow readings of fluid flow subsystems may be continuously monitored or monitored at defined or determined intervals.

In various exemplary embodiments of the systems and methods according to this invention, the sensor readings of fluid flow subsystems may be used to diagnose the fluid flow subsystem either continuously or at defined or determined intervals. In various exemplary embodiments of the systems and methods according to this invention, several fluid flow subsystems may be continuously monitored or monitored at defined or determined intervals. In various exemplary embodiments of the systems and methods according to this invention, warnings may be given based on the diagnosis of a fluid flow subsystems. The system may be monitored and/or diagnosed directly or remotely. The system can be monitored or diagnosed manually or automatically. Multiple subsystems of a single device may be monitored and/or diagnosed sequentially or simultaneously, and/or separately or in tandem.

These and other features and advantages of this invention are described in, or are apparent from, the following detailed description of various exemplary embodiments of the apparatus and methods according to this invention.

BRIEF DESCRIPTION OF THE DRAWINGS

Various exemplary embodiments of the methods and systems of this invention will be described in detail, with reference to the following figures, wherein.

DETAILED DESCRIPTION OF EXEMPLARY EMBODIMENTS

Various exemplary embodiments of the systems and methods according to this invention enable the effective use of service personnel by giving warnings of the need to call service personnel and the remaining time before the fluid flow system needs to be shut down. In various exemplary embodiments of the systems and methods according to this invention, sensors in fluid flow systems are continuously monitored.

In various exemplary embodiments of the systems and methods according to this invention, the output sensor signal values from sensors in fluid flow systems are used to continuously diagnose the fluid flow system. In various exemplary embodiments of the systems and methods according to this invention, warning are output before shutting down the system.

Figure 1:
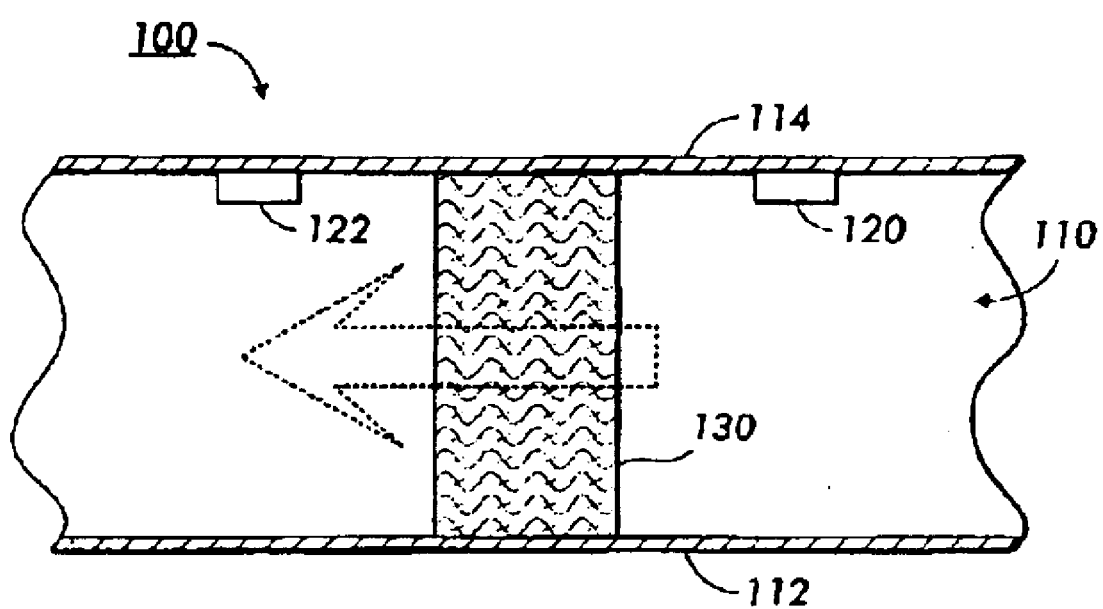
FIGS. 1 and 2 illustrates exemplary embodiment of a fluid flow through a fluid flow system element and the associated sensors.
Figure 2:
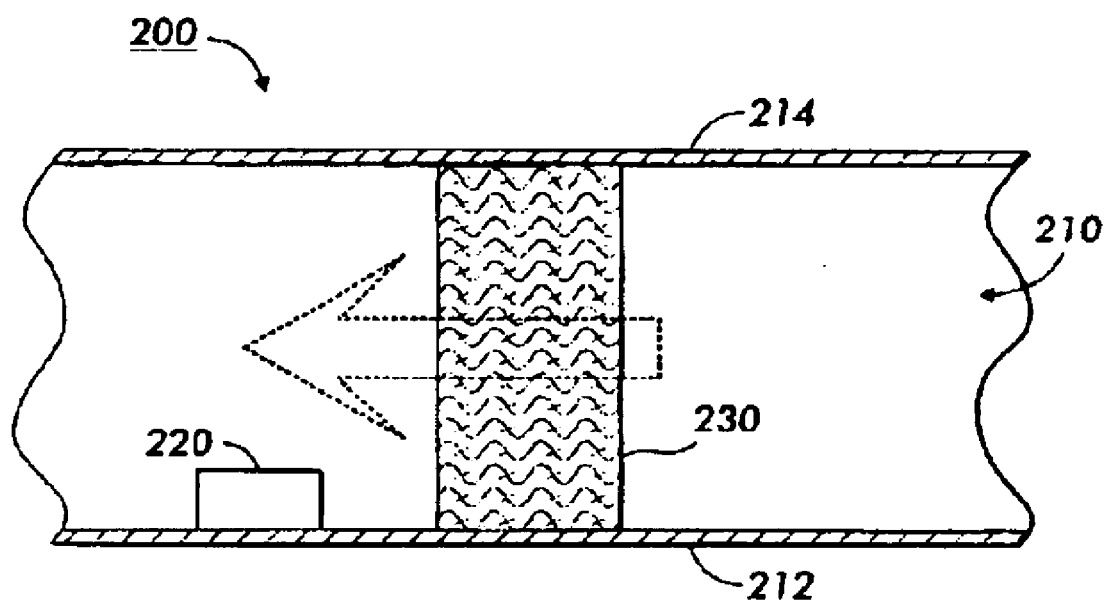

FIGS. 1 and 2 illustrates two exemplary embodiments of fluid flow through a fluid flow system element and past associated sensors. As shown in FIG. 1, the fluid flow subsystem 100 includes a fluid flow conduit 110, an upstream side 112, a downstream side 114, two or more sensors 120 and 122, and at least one fluid flow element 130.

In the exemplary embodiment shown in FIG. 1, at least two sensors 120 and 122 sense one or more parameters associated with the fluid flow. The sensors 120 and 122 can measure one or more parameters of the fluid flow in the fluid flow subsystem 100. When a flow of fluid in the fluid flow subsystem 100 is unobstructed, or otherwise working normally, the sensors 120 and 122 generate sensor signal values which are in a normal operating range for the parameter being sensed. In particular, in the exemplary embodiment shown in FIG. 1, the sensors 120 and 122 measure an amount of change in one or more parameters as the flow of fluid passes through or by the one or more fluid flow element 130.

However, when the flow of fluid in the fluid flow subsystem 100 is obstructed or otherwise not working normally, the sensor signals generated by the sensors 120 and 122 may result in one or more readings for one or more parameters that are not within the corresponding expected ranges. In various exemplary embodiments, because the amount of change of the one or more parameters measured by the sensors 120 and 122 may be outside of the corresponding range, the one or more fluid flow elements 130 may not be working properly, such as being clogged, torn, missing, improperly installed, or the like. In various other exemplary embodiments, the measured amount of change may be outside the corresponding range because the fluid flow conduit 110 or one or more other fluid flow elements within the fluid flow conduit 110, upstream or downstream of the one or more fluid flow elements 130, are clogged, punctured, improperly installed, or the like.

Exemplary embodiments of the sensors 120 and 122 includes pressure sensors, volume flow sensors, or the like. Exemplary embodiments of the fluid flow element 130 includes filters, restrictors, valves, or the like.

One exemplary implementation of the exemplary embodiment shown in FIG. 1 is pressure sensors surrounding a filter. In such an exemplary implementation, the pressure sensors 120 and 122 may be used to monitor the dirt accumulation in the filter 130. For example, when a pressure reading in the downstream pressure sensor 122 is excessively lower than the upstream pressure sensor 120, that is, when the difference between the sensor pressure levels measured by the pressure sensors 120 and 122 is above or outside of a desired pressure difference range, the filter 130 may be blocked by an excessive accumulation of dirt. On the other hand, for example, when a pressure reading in the downstream pressure sensor 122 is substantially equal to the upstream pressure sensor 120, that is, when the difference is below or outside of the desired pressure difference range, the filter 130 may be torn, missing, or improperly installed.

FIG. 2 shows another exemplary embodiment of a fluid flow subsystem 200. As shown in FIG. 2, the fluid flow subsystem 200 includes a fluid flow conduit 210, an upstream side 212, a downstream side 214, at least one sensor 220 and at least one fluid flow element 230. In the exemplary embodiment shown in FIG. 2, the at least one sensor 220 senses at least one parameter associated with the fluid flow. When a flow of fluid in the fluid flow subsystem 200 is working normally, the one or more sensors 220 generate sensor signals having values within a defined normal operating range for each of the one or more sensed parameters. However, when the flow of fluid in the fluid flow subsystem 200 is obstructed or otherwise not working normally, the sensor signals generated by the one or more sensors 220 may result in one or more-readings for one or more parameters that are not within the corresponding expected ranges. In various exemplary embodiments, the sensed value for a given parameters sensed by one of the sensors 220 may be outside the corresponding range because the fluid flow element 230 is not properly working, such as because it is clogged, torn, missing, improperly installed, or the like. In various other exemplary embodiments, the sensor value may be outside of the corresponding range because the fluid flow conduit 210 and/or one or more other fluid flow elements within the fluid flow conduit 210 are clogged, punctured, improperly installed, or the like.

In the exemplary embodiment shown in FIG. 2, the sensor 220 may be located within the fluid flow conduit 210 on the upstream side 212 or on the downstream side 214 of the one or more fluid flow element as desired. Exemplary embodiments of the sensor 220 includes pressure sensors, volume flow sensors, or the like. Exemplary embodiments of the one or more fluid flow element 230 include filters, restrictors, valves, or the like.

One exemplary implementation of the exemplary embodiment shown in FIG. 2 may be a volume flow sensor with a filter. In such an exemplary embodiment, the volume flow sensor 220 may be used to monitor the volume flow rate through the filter 230, which decreases as more dirt accumulates in the filter 230. For example, when the fluid flow rate drops below a first threshold, the filter has become sufficiently laden with accumulated dirt that the fluid no longer flows through the filter at a sufficient rate to ensure proper operation of the device containing the subsystem 200.

A variation that may be applied to each of the above described exemplary embodiment individually or in any combination thereof improves the continuous monitoring of the fluid flow subsystem 100 and/or 200. The variation involves when the one or more sensors 120 and 122 in one exemplary fluid flow subsystem 100 and one or more sensors 220 in the exemplary fluid flow subsystem 200 are working improperly. The resulting one or more sensor values will suggest that a problem exists in the exemplary fluid flow subsystem 100 or 200 when there is actually no problem. Consequently, this indicates the need to replace one or more sensors rather than indicating that the fluid flow subsystem needs repair or the like.

Figure 3:
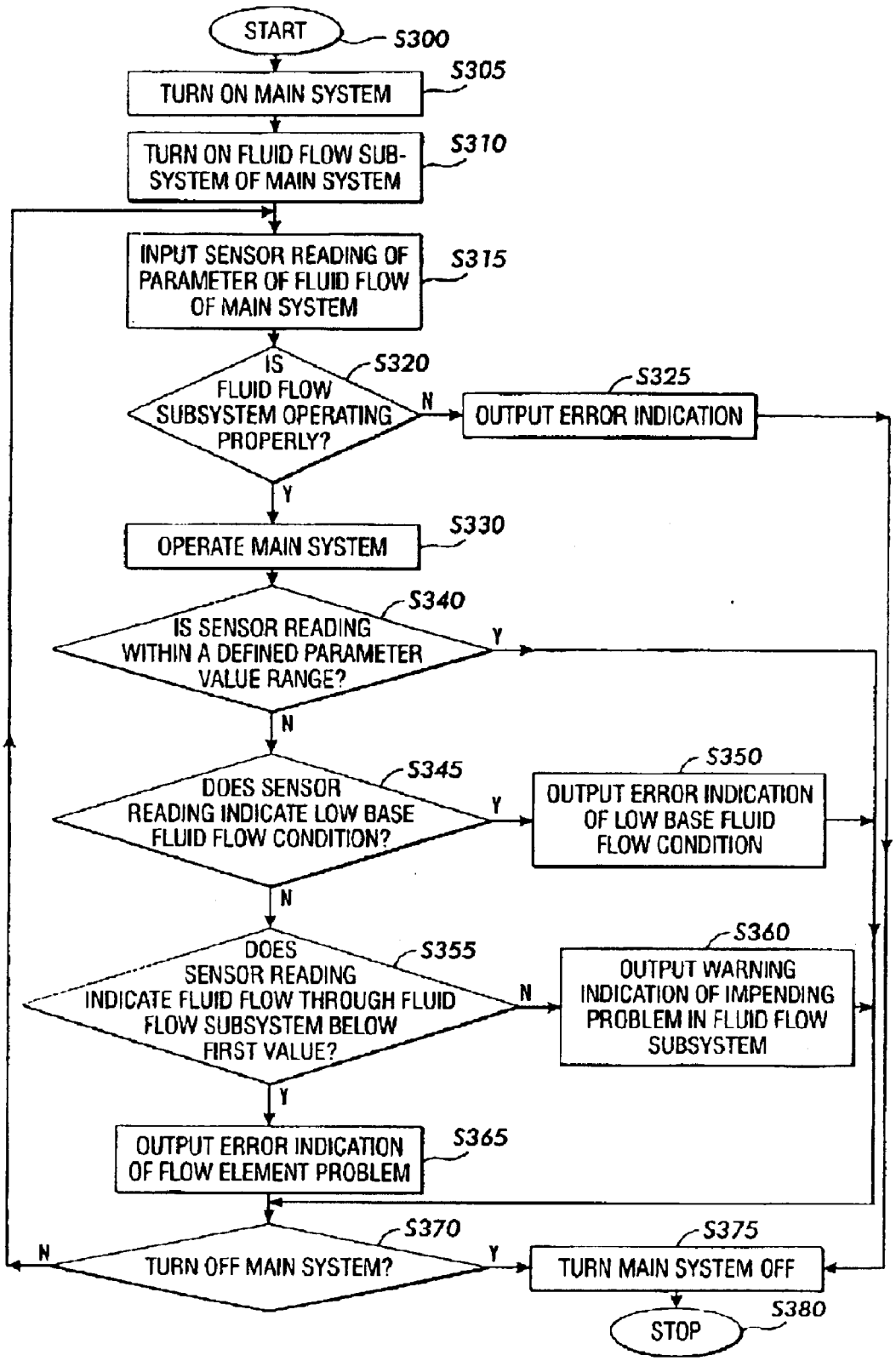
FIG. 3 is a flowchart outlining a first exemplary embodiment of a method for analyzing the operation of a fluid flow system according to this invention.

FIG. 3 is a flowchart outlining a first exemplary embodiment of a method for analyzing the operation of a fluid flow system according to this invention. In various exemplary embodiments, the method outlined in FIG. 3 can be used to analyze whether the fluid flow system is operating properly by determining whether the fluid values are between a given range of fluid flow, and if not, whether the fluid flow system can continue to operate despite the detected fluid flow condition.

As shown in FIG. 3, operation of the method begins in step S300, and continues to step S305, where the main system is turned on. Then, in step S310, the fluid flow subsystem of the main system is turned on. Next, in step S315, a sensor reading for the one or more sensors within the fluid flow subsystem 300 is made. Then, in step S320, a determination is made, based on the one or more sensor readings, whether the fluid flow subsystem of the main system is operating properly. If the fluid flow subsystem is not operating properly, the operation continues to step S325. Otherwise, the operation jumps to step S330.

In step S325, an error indication is output. Operation then jumps to step S375. In contrast, in step S330, the main system is operated. Next, in step S340, a determination is made whether the one or more sensor readings are within a defined parameter value range for one or more sensed parameters. If the one or moresensor readings are within a corresponding defined parameter ranges for the one or more sensed parameters, the operation jumps to step S370. Otherwise, the operation continues to step S345.

In step S345, a determination is made whether the one or more sensor readings indicates a low base fluid flow condition. If so, the operation continues to step S350. Otherwise, the operation jumps to step S355. In step S350, an error indication of low base fluid condition, is output. The operation then jumps to step S370. In contrast, in step S355, a determination is made whether the one or more sensor readings indicate that the fluid flow through the fluid flow subsystem is below a first value. If the one or more sensor readings do not indicate that the fluid flow is below the first value, operation continues to step S360. Otherwise, operation jumps to step S365.

In step S360, a warning indicating an impending problem in the fluid flow subsystem is output. The operation then again jumps to step S370. In contrast, in step S365, an error indication of a flow element problem is output. Next, in step S370, a determination is made whether to turn off the main system. If the main system is not to be turned off, the operation jumps back to step S315. Otherwise, the operation continues to step S375, where the main system is turned off. Then, in step S380, operation of the method ends.

Figure 4:
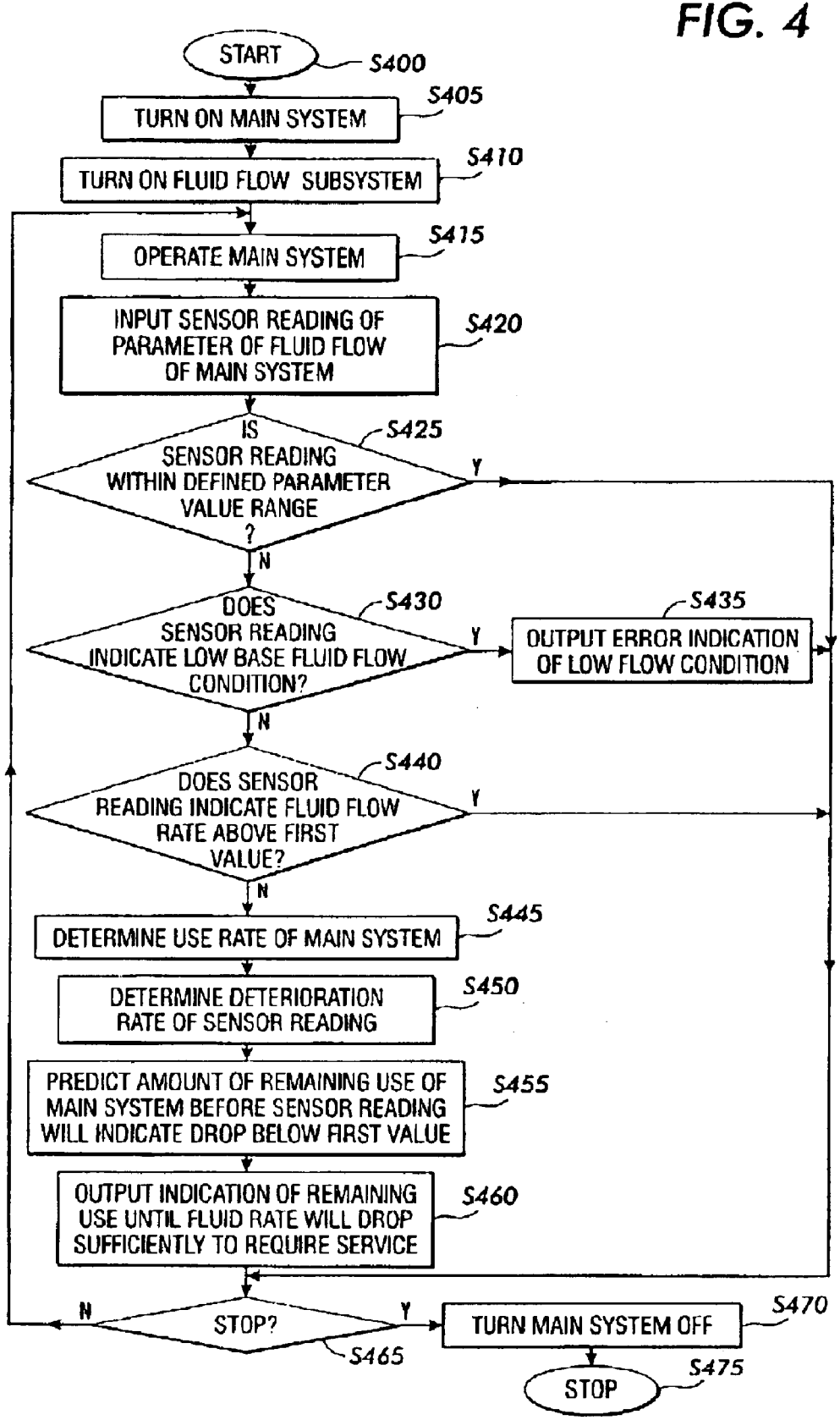
FIG. 4 is a flowchart outlining a second exemplary embodiment of a method for analyzing the operation of a fluid flow system according to this invention.

FIG. 4 is a flowchart outlining a second exemplary embodiment of a method for analyzing the operation of a fluid flow system for this invention. In various exemplary embodiments, the methods outlined in FIG. 4 can be used to analyze whether the fluid flow system according to this invention is operating properly by determining whether the fluid values are between a given range of fluid flow, and if not, whether the fluid flow system can continue to operate despite the condition.

As shown in FIG. 4, operation of the method begins in step S400, and continues to step S405, where the main system is turned on. Next, in step 410, the fluid flow subsystem is turned on. Then, in step S415, the main system is operated. Operation then continues to step S420, where one or more sensor readings of the parameter of fluid flow of the main system sensed and input. Next, in step S425, a determination is made whether the one or more sensor readings are within defined parameter value ranges. If so, the operation continues to step S465. Otherwise, the operation jumps to step S430.

In step S430, a determination is made whether the one or more sensor readings are indicative of a low base fluid flow condition. If the one or more sensor readings are indicative of a low base fluid flow condition, operation continues to step S435. Otherwise, the operation continues to step S440. In step S435, an error message indicating the low base fluid flow condition is output. Operation then jumps to step S465. In contrast, in step S440, a determination is made whether the one or sensor readings are indicative of a fluid flow rate above a first value. If so, operation again jumps to step S465. Otherwise, operation continues to step S445.

In step S445, the use rate of the main system is determined. Next, in step S450, a deterioration rate of the reading sensed by the one or more sensors is determined. Then to step S455, the amount of remaining use of the main system before the sensor reading will drop below a first value is determined based on the determined use rate of the main system and the determined deterioration rate of the reading sensed by the one or more sensors. Operation then continues to step S460.

In step S460, an indication of remaining use for the main and subsystems until the fluid rate will drop sufficiently to require service is output. Then, in step S465, a determination is made whether to turn off the main system. If so, operation continues to step S470. Otherwise, operation jumps back to step S415. In step S470, the main system is turned off. Operation then continues to step S475, where operation of the method ends.

Figure 5:
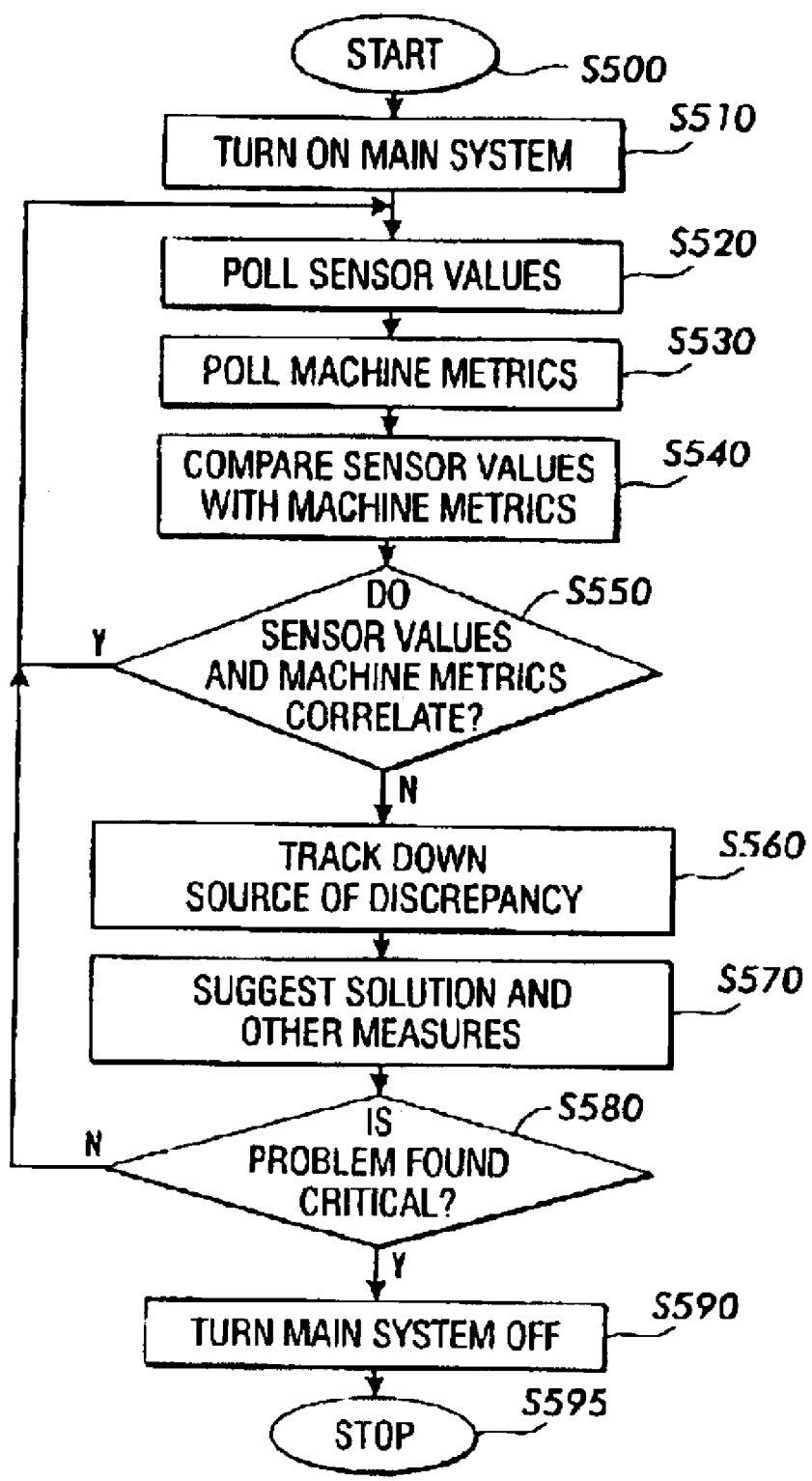
FIG. 5 is a flowchart outlining a third exemplary embodiment of a method for analyzing the operation of a fluid flow system according to this invention.

FIG. 5 is a flowchart outlining a third exemplary embodiment of a method for analyzing the operation of a fluid flow system according to this invention. In various exemplary embodiments, the method outlined in FIG. 5 can be used to find a main system component that needs service or replacement and determine the most effective time for such service and replacement.

As shown in FIG. 5, operation of the method begins in step S500, and continues to step S510, where the main system is turned on. Next, in step S520, one or more sensor values are sensed. Then, in step S530, one or more machine metrics are measured. Next, in step S540, the sensed one or more sensor values and the measured one or more machine metrics are compared and analyzed. Then, in step S550, a determination is made whether the polled sensor values and the polled machine metrics correlate. If so, the operation jumps back to step S520. Otherwise, the operation continues to step S560.

In step S560, one or more sources of discrepancies between the sensed sensor values and the measured machine metrics are tracked down. Then, in step S570, one or more solutions to fixing the one or more sources of discrepancies or any other measures are determined, suggested or output. Next, in step S580, a determination is made whether the discrepancies are indicative of a critical problem. If the discrepancies are not indicative of a critical problem, operation again jumps back to step S520. Otherwise, operation continues to step S590, where the main system is turned off. Operation then continues to step S595, where operation of the method ends.

Figure 6:
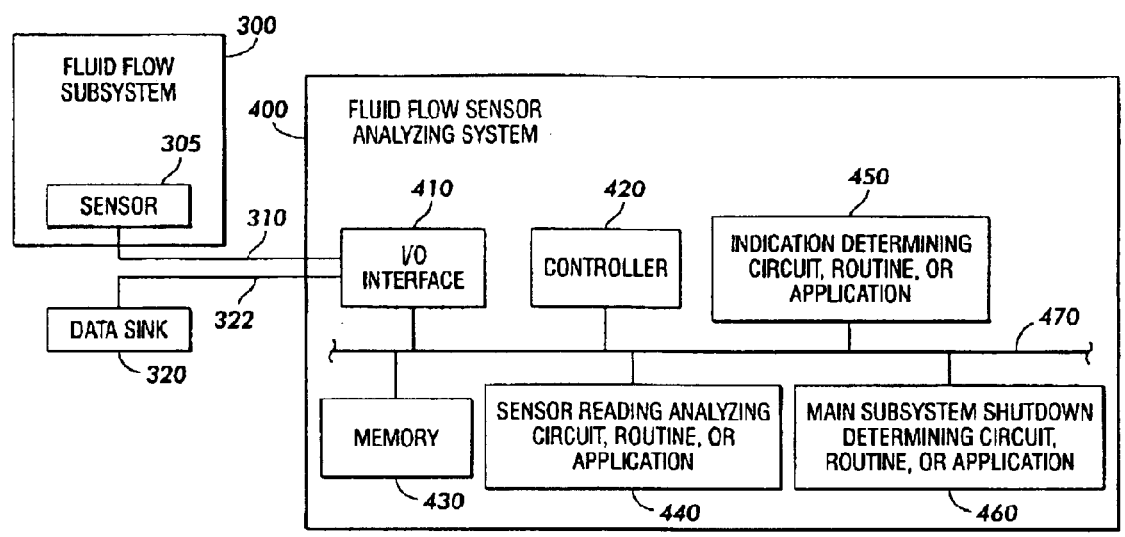
FIG. 6 is a block diagram of an exemplary embodiment of a fluid flow sensor analyzing system according to this invention.

FIG. 6 is a block diagram illustrating one exemplary embodiment of a fluid flow sensor analyzing system 400 according to this invention. As shown in FIG. 6, one or more sensors 305 of a fluid flow system 300 are connected by one or more links 310 to the fluid flow sensor analyzing system 400. The one or more sensors 305 of the fluid flow subsystem 300 measure a flow of fluid in the fluid flow subsystem 300. Similarly, a data sink 320 that is usable to receive data output by the fluid flow sensor analyzing system 400 is connected to the fluid flow analyzing system 400 over a link 322. The links 310 and 322 can each be any known or later-developed device or system for connecting the sensors 305 and/or the data sink 320, respectively, to the fluid flow sensor analyzing system 400, including a direct cable connection, a connection over a wide area network, or a local area network, a connection over an intranet, a connection over the internet, or a connection over any other distributed processing network or system.

The fluid flow sensor analyzing system 400 includes one or more of an input/output interface 410, a controller 420, a memory 430, a sensor reading analyzing circuit, routine or application 440, an indication determining circuit, routine or application 450, a main subsystem shutdown determining circuit, routine, application 460, each interconnected by one or more control and/or data busses and/or application programming interfaces 470.

The input/output interface 410 is connected to the links 310 and 322 and thus connects the fluid flow sensor analyzing system 400 to the sensors 305 and the data sink 320. The controller 420 controls the input/output interface 410, the memory 430, the sensor reading analyzing circuit, routine or application 440, the indication determining circuit, routine or application 450, and the main subsystem shutdown determining circuit, routine, application 460.

The controller 420 can be implemented using any appropriate device and exemplarily be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine, that is in turn capable of implementing the flowcharts shown in FIGS. 3–5, can be used to implement the controller 420.

The memory 430 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writeable or a rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The data regarding the main and any subsystem functions obtained by the fluid flow sensor analyzing system 400 from the one or more sensors 305 will be analyzed by the sensor reading analyzing circuit, routine or application 440. The indication determining circuit, routine or application 450 generates indications of the main and/or any subsystem functions, especially any problems based on the analysis generated by the sensor reading analyzing circuit, routine or application 440. The analysis generated by the sensor reading analyzing circuit, routine or application 440 will also be used by the main subsystem shutdown determining circuit, routine or application 460 to determine whether to shut down the main system pending maintenance.

In operation of the fluid flow sensor analyzing system 400, one or more sensor values are received by the input/output interface 410 in the fluid flow sensor analyzing system 400 from the one or more sensors 305. The one or more sensor values are, under the control of the controller 420, routed through the one or more control and/or data busses and/or application programming interfaces 470 to the sensor reading analyzing circuit, routine or application 440. The sensor reading analyzing circuit, routine or application 440 determines if the one or more sensor values are within defined parameter value ranges, if they are above or below a first given value, if they indicate a low base fluid flow condition, or the like. If so, the sensor reading analyzing circuit, routine or application 440 outputs a signal indicating this to the one or more control and/or data busses and/or application programming interfaces 470. Otherwise, the sensor reading analyzing circuit, routine or application 440 outputs a signal indicating that one or more sensor values are not within a defined parameter value range. This latter signal is sent, under control of the controller 420, to the indication determining circuit, routine or application 450. The indication determining circuit, routine or application 450 generates an indication of the main and/or any subsystem functions based on the signal received from the sensor reading analyzing circuit, routine or application 440. The indication generated by the indication determining circuit, routine or application 450 can be to call a service personnel, or the like, and can comprise beeps, chimes, flashing displays and/or indication on a monitor, or other data communications devices, systems or structures, or the like.

The signal from the sensor reading analyzing circuit, routine or application 440 is also sent, under control of the controller 420, to the main subsystem shutdown determining circuit, routine or application 460. The main subsystem shutdown determining circuit, routine or application 460 determines if the main subsystem should be shutdown in response to the signal received from the sensor reading analyzing circuit, routine or application 440. If so, the main subsystem shutdown determining circuit, routine or application 460 shuts down the main system and sends a separate signal, under control of the controller 420, to the indication determining circuit, routine or application 450. Upon receiving this second signal from the main subsystem shutdown determining circuit, routine or application 460, the indication determining circuit, routine or application 450 indicates the shutdown of the main subsystem accordingly. Each of the signals generated from the sensor reading analyzing circuit, routine or application 440, the indication determining circuit, routine or application 450, the main subsystem shutdown determining circuit, routine or application 460 may be stored in the memory 430. Further, any signal generated by the input/output interface 410 or the controller 420 may also be stored in the memory 430.

While FIG. 6 shows a fluid flow sensor analyzing system 400 as a separate device from the fluid flow subsystem 300 and the data sink 320, the fluid flow sensor analyzing system 400 may be an integrated device. In an integrated configuration, the fluid flow subsystem 300, the data sink 320 and the fluid flow sensor analyzing system 400 may be contained in a single device.

Alternatively, the fluid flow sensor analyzing system 400 may be a separate device containing the input/output interface 410, the controller 420, the memory 430, the indication determining circuit, routine or application 440, the sensor reading analyzing circuit, routine or application 450, the main subsystem shutdown determining circuit, routine, application 460. Furthermore, the indication determining circuit, routine or application 440, the sensor reading analyzing circuit, routine or application 450, the main subsystem shutdown determining circuit, routine, application 460 may be integrated.

As shown in FIG. 6, the fluid flow sensor analyzing system 400 is, in various exemplary embodiments, implemented on a programmed general purpose computer However, the fluid flow sensor analyzing system 400 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 3–5, can be used to implement the fluid flow sensor analyzing system 400.

It should be understood that each of the circuits shown in FIG. 6 can be implemented as portions of a suitably programmed general purpose computer. Alternatively, each of the circuits shown in FIG. 6 can be implemented as physically distinct hardware circuits within an ASIC, or using a FPGA, a PLD, a PLA or a PAL, or using discrete logic elements or discrete circuit elements. The particular form each of the circuits shown in FIG. 6 will take is a design choice and will be obvious and predicable to those skilled in the art.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for analyzing an operation of a fluid flow element of a fluid flow subsystem of a main system, comprising:

inputting at least one sensor reading from at least one sensor of the fluid flow subsystem, the at least one sensor reading indicative of a value of at least one parameter of the fluid flow subsystem;

analyzing the at least one sensor reading to determine a value of at least one of the at least one parameter;

comparing the at least one determined value to at least one corresponding value;

outputting an error indication of the fluid flow subsystem based on the comparison, wherein the error indication comprises both a warning of a need for service and an indication of a remaining time before the fluid flow subsystem will be shut down.

2. The method of claim 1, further comprising:

determining whether the fluid flow subsystem is operating properly based on the at least one comparison.

3. The method of claim 2, wherein determining whether the fluid flow subsystem of the main system is operating properly comprises determining whether a sensor reading is within a defined parameter value range.

4. The method of claim 2, wherein determining whether the fluid flow subsystem of the main system is operating properly comprises determining whether the sensor reading indicates a low base fluid condition.

5. The method of claim 2, wherein determining whether the fluid flow subsystem of the main system is operating properly comprises determining whether the sensor reading indicate a fluid flow through the fluid flow subsystem is below a given first value.

6. The method of claim 2, wherein determining whether the fluid flow subsystem of the main system is operating properly comprises determining whether the sensor reading indicate a fluid flow through the fluid flow subsystem is above a given first value.

7. The method of claim 1, wherein the warning includes beeps, chimes or flashing displays, and the indication of the remaining time includes an intensity of the beeps, the chimes or the flashing displays.

8. The method of claim 1, wherein the warning includes a display on a monitor, and the indication of the remaining time includes a numerical estimate on the monitor.

9. A method for analyzing an operation of a fluid flow element of a fluid flow subsystem, comprising:

determining a deterioration rate of a reading measured by a sensor of the fluid flow system;

determining a rate of use of a main system;

determining an amount of remaining use of the main system before the sensor reading will drop below a first value; and providing a warning that includes both an indication of a need for service and an indication of the remaining time before the main system will be shut down.

10. The method of claim 9, further comprising determining whether the sensor reading is indicative of a low base fluid flow condition.

11. The method of claim 9, further comprising inputting at least one sensor reading of at least one fluid flow parameter of the fluid flow element.

12. The method of claim 9, further comprising determining whether the sensor reading is within at least one corresponding parameter value range.

13. The method of claim 9, further comprising determining whether the sensor reading is indicative if a fluid flow rate above a first given value.

14. A method for analyzing an operation of a fluid flow system, comprising:

polling at least one sensor value;

polling at least one machine metric;

comparing the polled at least one sensor value with the polled at least one machine metric;

determining whether the polled at least one sensor value and the polled at least one machine metric correlate;

tracking down a source of the discrepancy between the polled at least one sensor value and the polled at least one machine metric; and providing a warning that includes both an indication of a need for service and an indication of a remaining time before the fluid flow system will be shut down.

15. The method of claim 14, further comprising:

determining whether the source of the discrepancy is indicative of a critical problem.

16. The method of claim 14, further comprising:

suggesting a solution to fixing the discrepancy.

17. The method of claim 14, further comprising:

shutting down the main system if the source of the discrepancy is indicative of a critical problem.

18. A fluid flow system for continuously monitoring a flow of fluid, comprising:

a sensor reading analyzing circuit, routine or application that senses a condition of the flow of the fluid;

an indication determining circuit, routine or application that determines whether the sensed condition indicates an error, and if the sensed condition indicates an error, provides a warning that includes both an indication of a need for service and an indication of a remaining time before the fluid flow system will be shut down; and a main system shut down determining circuit, routine or application that shuts down the fluid flow system when the remaining time is up.

19. The fluid flow system of claim 18, further comprising an input/output interface that outputs the warning.

20. The fluid flow system of claim 18, further comprising a storage location that stores metrics of the fluid flow system to be compared with the sensed condition.

21. The fluid flow system of claim 18, further comprising a controller that compares the sensed condition with a metric of the fluid flow system.

22. The fluid flow system of claim 18, wherein the indication of the need for service includes beeps, chimes or flashing displays, and the remaining time includes an intensity of the beeps, chimes or flashing displays.

23. The fluid flow system of claim 18, wherein the indication of a need for service includes a display on a monitor, and the indication of the remaining time includes numerical estimates on the monitor.

* * * * *